United States Patent [19]

Bonnet et al.

[11] Patent Number: 5,872,183
[45] Date of Patent: Feb. 16, 1999

[54] POLYOL-BASED PLASTICIZED COMPOSITION WHICH HAS A CONTROLLED VISCOSITY

[75] Inventors: Evelyne Bonnet, Lamorlaye; Jean-Jacques Flat, Serquigny; Jacques Fontela, Bernay, all of France

[73] Assignee: Elf Atochem S.A., Puteaux, France

[21] Appl. No.: 766,254

[22] Filed: Dec. 13, 1996

[30] Foreign Application Priority Data

Dec. 13, 1995 [FR] France ................................... 95 14795

[51] Int. Cl.$^6$ .............................. C08G 63/48; C08L 61/00
[52] U.S. Cl. ........................... 525/66; 525/123; 525/131; 525/440; 525/453
[58] Field of Search ..................... 524/229, 296, 524/297, 507; 525/440, 453, 66, 123, 131

[56] References Cited

U.S. PATENT DOCUMENTS

| | | |
|---|---|---|
| Re. 33,354 | 9/1990 | Downey et al. . |
| Re. 33,755 | 11/1991 | Downey et al. . |
| 3,378,511 | 4/1968 | Newton . |
| 4,355,130 | 10/1982 | Heinze . |
| 4,666,968 | 5/1987 | Downey et al. . |
| 4,705,724 | 11/1987 | Downey et al. . |
| 4,787,905 | 11/1988 | Loi . |
| 5,258,578 | 11/1993 | Smith et al. . |
| 5,362,834 | 11/1994 | Schapel et al. ........................... 528/85 |

OTHER PUBLICATIONS

Abstract for Australian Patent AU 10635/76.

*Primary Examiner*—Judy M. Reddick
*Attorney, Agent, or Firm*—Pennie & Edmonds LLP

[57] ABSTRACT

The invention relates to a polyol-based plasticized composition which includes a sufficient quantity of a thickening additive to obtain a viscosity at 20° C. of at least 4 Pa•s. This plasticized composition can be employed for obtaining a polyurethane gel.

16 Claims, No Drawings

POLYOL-BASED PLASTICIZED COMPOSITION WHICH HAS A CONTROLLED VISCOSITY

TECHNICAL FIELD

The invention relates to a plasticized composition which has a controlled viscosity, based on at least one polyol and usable especially for obtaining polyurethane gels. The invention also relates to these polyurethane gels.

BACKGROUND OF THE INVENTION

The term gel must be understood as describing the physical state of the final product. The terms polyurethane gel therefore refer at present to a plasticized polyurethane obtained by bringing a plasticized composition (I) based on at least one polyol into contact with at least one polyisocyanate.

For certain highly specific electrical applications such as electrical insulation or cable filling, or else for paramedical applications (antiscab mats and pads, mammary prosthesis), polyurethane gels are required which have a low consistency and which are obtained rapidly after the composition (I) has been brought into contact with a polyisocyanate.

More precisely, what is sought after is plasticized compositions (I) based on polyols which, at ambient temperature (approximately 20° C.) have a high viscosity, equal to or higher than 4 Pa•s and in which the reactants (polyols) are capable of reacting with the polyisocyanate.

Known plasticized compositions contain high plasticizer ratios which are likely to lower considerably the viscosity of the said polyol-based compositions.

Thus, U.S. Pat. No. 4,787,905 describes a gel which can be employed for the manufacture of a mammary prosthesis. A low-viscosity plasticized composition is produced for this purpose, containing 10% by weight of a polydiene polyol and 90% by weight of undecyl phthalate.

Similarly U.S. Pat. No. 4,666,968 describes a low-viscosity polyurethane gel which can be employed in electrical insulation and which contains a high plasticizer content. This gel is obtained particularly by bringing a plasticized composition containing a polyisocyanate into contact with a highly plasticized composition containing polyols.

U.S. Pat. No. 5,258,578 also describes low-viscosity polyurethane gels which can be employed for cable terminals and connection boxes.

SUMMARY OF THE INVENTION

The invention relates to a polyol-based plasticized composition which includes a sufficient quantity of a thickening additive to obtain a viscosity at 20° C. of at least 4 Pa•s. This plasticized composition can be employed for obtaining a polyurethane gel.

DETAILED DESCRIPTION OF THE INVENTION

To increase the viscosity of such highly plasticized compositions the Applicants have employed more viscous plasticizers, but these plasticizers had the disadvantage of being poorly miscible or immiscible with the constituents of the composition and resulted in phase separations (demixing).

A plasticized composition (I) has now been found, including at least one polyol, at least one plasticizer, optionally a catalyst and optionally one or more chain extenders, characterized in that it additionally includes a sufficient quantity of a thickening additive to obtain a viscosity at 20° C. of at least 4 Pa•s and, preferably, of between 5 Pa•s and 300 Pa•s, measured at an impulse rate of 10 rad/s using dynamic rheology.

According to the present invention a thickening additive refers to a thermoplastic polymer making it possible to increase the viscosity of the polyol-based plasticized composition (I).

The thickening additives which can be employed according to the present invention are chosen from:

a) copolymers of ethylene and of at least one α-olefin containing from 3 to 8 carbon atoms, which have a relative density ranging approximately from 0.89 to 0.95;

b) copolymers of ethylene and of at least one vinyl ester of a saturated carboxylic acid containing 2 to 6 carbon atoms, such as vinyl acetate;

c) ethylene/unsaturated acid ester copolymers, the said acid preferably containing an ethylenic unsaturation adjacent to the carboxylic group. The unsaturated acid is preferably a monoacid such as acrylic acid, methacrylic acid, crotonic acid or cinnamic acid. It may also be a diacid such as maleic acid, fumaric acid, citraconic acid, glutaconic acid or muconic acid. In the case of diacids the unsaturated acid ester may be a monoester or, preferably, a diester. The alcohol from which the unsaturated acid ester is derived preferably contains from 1 to 8 carbon atoms. The esterifying group may be linear or branched, such as, for example, methyl, ethyl, n-propyl, iso-propyl, n-butyl, iso-butyl, tert-butyl, iso-amyl, n-hexyl, 2-ethylhexyl or iso-octyl;

d) terpolymers which, in addition to the units derived from ethylene and those derived from a vinyl ester of a saturated carboxylic acid of the copolymers b), or in addition to the units derived from ethylene and those derived from an unsaturated acid ester of the copolymers c), include units derived from an unsaturated dicarboxylic acid anhydride, it being possible for these to be present in a proportion ranging up to approximately 5% by weight in the copolymer. The anhydride present may be chosen from citraconic anhydride, itaconic anhydride, tetrahydrophthalic anhydride and, preferably, maleic anhydride;

e) terpolymers which, in addition to the units derived from ethylene and those derived from the unsaturated acid ester of the copolymers c), include units derived from an unsaturated glycidyl monomer, it being possible for these to be present in a proportion ranging up to approximately 18% by weight in the copolymer. The glycidyl monomer may be chosen especially from glycidyl methacrylates and acrylates, mono- and diglycidyl itaconates and mono-, di- and triglycidyl butenetricarboxylate; and f) graft polymers resulting from the grafting of at least one monomer chosen from carboxylic acids containing ethylenic unsaturation, the corresponding anhydrides and the derivatives of these acids and acid anhydrides onto the copolymers a), b) and c) and onto the terpolymers d).

According to the invention, ethylene/vinyl acetate copolymers, ethylene/alkyl acrylate copolymers such as ethylene/butyl acrylate copolymers, ethylene/vinyl acetate/maleic anhydride terpolymers and ethylene/alkyl acrylate/maleic anhydride terpolymers such as ethylene/ethyl acrylate/maleic anhydride terpolymers are preferably employed.

According to the present invention, the viscosity of the polyol-based plasticized composition (I) can be obtained by means of the use of at least 5 parts by weight of thickening additive per 100 parts by weight of polyol and, preferably, 30 to 110 parts by weight.

Esters of divalent or polyvalent carboxylic acids will be mentioned among the plasticizers that can be employed according to the present invention.

Examples of such polycarboxylic acids which will be mentioned are succinic, phthalic, trimellitic and fumaric acids, dimeric and trimeric fatty acids like oleic acid, optionally mixed with monomeric fatty acids, and phthalic, tetrahydro- and hexahydrophthalic, endomethylenetetrahydrophthalic, glutaric and maleic anhydrides. Among the alcohols which esterify the acids and the anhydrides will be mentioned branched or unbranched aliphatic alcohols which have a carbon number ranging from 1 to 20, such as methanol, ethanol, propanol, iso-propanol, n-butanol, sec-butanol, tert-butanol, the various isomers of pentyl alcohol, of hexyl alcohol, of octyl alcohol (for example 2-ethylhexanol), of nonyl alcohol, of decyl alcohol, of lauryl alcohol, of myristyl alcohol, of cetyl alcohol and of stearyl alcohol, as well as the alcohols from fatty substances and from waxes of natural origin, or obtained by hydrogenation of carboxylic acids of natural origin. Cycloaliphatic alcohols such as cyclohexanol and its homologues can be employed. It is also possible to employ aromatic hydroxy compounds such as phenol, cresol, thymol, carvacrol, benzyl alcohol and phenylethyl alcohol.

Phosphorus-containing plasticizers can also be employed, such as the esters of branched or unbranched aliphatic, cycloaliphatic or aromatic alcohols referred to above and of orthophosphoric acid.

Polymeric plasticizers can also be employed, such as, for example, the polyesters of adipic acid, of sebacic acid or of phthalic acid, as well as polybutadiene, polyisoprene and polyisobutene oligomers.

Among these plasticizers, alkyl phthalates such as dioctyl phthalate and diisotridecyl phthalate are preferably employed.

According to the present invention the plasticizer represents at least 10 parts by weight per 100 parts by weight of polyol and preferably 50 to 1,000 parts by weight.

According to the present invention the polyols which can be employed have a number-average molecular mass $\overline{Mn}$ ranging from 500 to 15,000.

Polyols which have a number-average molecular mass $\overline{Mn}$ ranging from 1,000 to 3,000 will preferably be employed.

The polyols which can be employed according to the present invention may be chosen from polyesterpolyols, polyetherpolyols, polythioetherpolyols, polyacetylpolyols, polycarbonatepolyols, polyesteramidepolyols, polyamidepolyols, polydienepolyols and the mixture of at least two of the above-mentioned polyols.

As polyesters bearing hydroxyl groups there will be mentioned the products of reaction of polyvalent, preferably divalent, alcohols, optionally accompanied by trivalent alcohols, and of polyvalent, and preferably divalent, carboxylic acids. Instead of the free polycarboxylic acids it is also possible to employ in the preparation of the polyesters the corresponding anhydrides of polycarboxylic acids or esters of polycarboxylic acids and of the corresponding lower alcohols or mixtures thereof. The polycarboxylic acids may be of aliphatic, cycloaliphatic, aromatic and/or heterocyclic nature and optionally substituted, for example by halogen atoms, and/or saturated.

By way of illustration of such carboxylic acids and derivatives there will be mentioned: succinic, adipic, suberic, azelaic, sebacic, phthalic and trimellitic acids and phthalic, tetrahydrophthalic, hexahydrophthalic, tetrachlorophthalic, endomethylenetetrahydrophthalic and glutaric anhydrides, maleic acid, maleic anhydride, fumaric acid, dimerized and trimerized unsaturated fatty acids optionally mixed with monomeric unsaturated fatty acids like oleic acid, and dimethyl terephthalate and bisglycol terephthalate.

Among the polyvalent alcohols there will be mentioned, for example, 1,2-ethanediol, 1,2- and 1,3-propanediol, 1,4- and 2,3-butanediol, 1,6-hexanediol, 1,8-octanediol, neopentyl glycol, 1,4-bishydroxymethylcyclohexane, 2-methyl-1, 3-propanediol, glycerol, trimethylolpropane, 1,2,6-hexanetriol, 1,2,4-butanetriol, trimethylolethane, pentaerythritol, quinitol, mannitol, sorbitol, formitol, methyl-glucoside, as well as diethylene glycol, triethylene glycol, tetraethylene glycol and the higher polyethylene glycols, dipropylene glycol and the higher propylene glycols and dibutylene glycol and the higher polybutylene glycols. The polyesters may carry carboxyl groups in some end positions. It is also possible to employ polyesters of lactones, for example of epsilon-caprolactone, or of hydroxycarboxylic acids, for example of omega-hydroxycaproic acid.

The polyetherpolyols which can be employed according to the invention, carrying at least 2, generally 2 to 8, preferably 2 to 3, hydroxyl groups, are those of the types which are known per se, which are obtained, for example, by polymerization of epoxides like ethylene oxide, propylene oxide, butylene oxide, tetrahydrofuran, styrene oxide or epichlorohydrin with themselves, for example in the presence of Lewis catalysts such as $BF_3$, or by addition of these epoxides, preferably of ethylene oxide and of propylene oxide, optionally as a mixture or successively, to starting components carrying reactive hydrogen atoms, like water, alcohols, aqueous ammonia or amines, for example 1,2-ethanediol, 1,3- or 1,2-propanediol, trimethylolpropane, glycerol, sorbitol, 4,4'-dihydroxydiphenylpropane, aniline, ethanolamine or ethylenediamine. In accordance with the invention it is also possible to employ sucrose polyethers or polyethers condensed with formitol or with formose. In many cases preference is given to polyethers containing preponderant proportions (up to 90% by weight relative to all the OH groups present in the polyether) of primary OH groups.

Polythioether polyols which will be mentioned in particular are the products of condensation of thiodiglycol with itself and/or with other glycols, dicarboxylic acids, formaldehyde and aminocarboxylic acids or aminoalcohols. Depending on the nature of the second component, the products obtained are, for example, mixed polythioethers, polythioetheresters or polythioetheresteramides.

By way of illustration of polyacetalpolyols there will be mentioned, for example, those which can be prepared from glycols like diethylene glycol, triethylene glycol, 4,4'-dihydroxyethoxydiphenyl-dimethylmethane, hexanediol and formaldehyde. It is also possible to employ in the invention polyacetals obtained by polymerization of cyclic acetals like, for example, trioxane.

By way of illustration of polycarbonates carrying hydroxyl groups there will be mentioned those of a type known per se which are obtained, for example, by reaction of diols like 1,3-propanediol, 1,4-butanediol and/or 1,6-hexanediol, diethylene glycol, triethylene glycol, tetraethylene glycol or thiodiglycol, with diaryl carbonates, for example diphenyl carbonate, or phosgene.

By way of illustration of polyesteramidepolyols and polyamidepolyols there will be mentioned, for example, the chiefly linear condensates obtained from saturated or unsaturated polyvalent carboxylic acids and from their anhydrides and from saturated or unsaturated polyvalent aminoalcohols, diamines, polyamines and mixtures thereof.

It is also possible to employ polyols which already contain urethane or urea groups, as well as optionally modified natural polyols like castor oil.

By way of illustration of polydienepolyols which can be employed according to the present invention there will be mentioned hydroxytelechelic conjugated diene oligomers which can be obtained by various processes, such as the radical polymerization of conjugated diene containing from 4 to 20 carbon atoms in the presence of a polymerization initiator such as hydrogen peroxide or an azo compound such as azobis-2,2'-[2-methyl-N-(2-hydroxyethyl) propionamide] or the anionic polymerization of a conjugated diene containing from 4 to 20 carbon atoms in the presence of a catalyst such as dilithiumnaphthalene.

According to the present invention, the conjugated diene of the polydienepolyol is chosen from the group including butadiene, isoprene, chloroprene, 1,3-pentadiene and cyclopentadiene.

According to the present invention, a butadiene-based polydienepolyol will be preferably employed.

Copolymers of conjugated dienes and of vinyl and acrylic monomers such as styrene and acrylonitrile are also suitable.

It would not constitute a departure from the invention to employ hydroxytelechelic butadiene oligomers epoxidized on the chain or else hydrogenated hydroxytelechelic oligomers of conjugated dienes.

According to the present invention, the polydienepolyols may have number-average molecular masses of at most 7,000 and preferably between 1,000 and 3,000. They have functionalities ranging from 1 to 5 and preferably between 1.8 and 3.

By way of illustration of polydienepolyols there will be mentioned the hydroxylated polybutadienes marketed by the company Elf Atochem S.A. under the names POLYBD®R45 HT and POLYBD®R20 LM.

Mixtures of the above-mentioned compounds may be employed, such as, for example, mixtures of polyetherpolyols and of polydienepolyols.

It would not constitute a departure from the scope of the invention to employ polyamine compounds which have a number-average molecular mass $\overline{Mn}$ of between 500 and 5,000.

By way of illustration of such compounds there will be mentioned the polyoxypropylenes ending in $NH_2$ functional groups, polyoxytetramethylenes and polybutadienes ending in $NH_2$ functional groups and butadiene/styrene and butadiene/acrylonitrile copolymers ending in $NH_2$ functional groups.

Compounds carrying at least two functional groups which are reactive with the isocyanate functional groups are, at present, referred to as a chain extender.

Hydroxyl functional groups and amine functional groups will be mentioned as examples of such reactive functional groups.

According to the invention, the chain extender may be chosen from polyols of molecular mass of between 62 and 500.

By way of illustration of such compounds, there will be mentioned ethylene glycol, propylene glycol, diethylene glycol, dipropylene glycol, 1,4-butanediol, 1,6-hexanediol, 2-ethyl-1,3-hexanediol, N,N-bis(2-hydroxypropyl)aniline, 3-methyl-1,5-pentanediol and the mixture of at least two of the above-mentioned compounds.

Polyamines of molecular mass of between 62 and 500 may also be employed as chain extenders.

By way of illustration of such polyamines, there will be mentioned ethylenediamine, diphenylmethanediamine, isophoronediamine, hexamethylenediamine and diethyltoluenediamine.

At least one part by weight of one or several above-mentioned chain extenders will be employed per 100 parts by weight of polyol used and, preferably 5 to 30 parts by weight.

The catalyst may be chosen from the group including tertiary amines, imidazoles and organometallic compounds.

1,4-Diazabicyclo[2.2.2]octane (DABCO) may be mentioned by way of illustration of tertiary amines.

Dibutyltin dilaurate and dibutyltin diacetate may be mentioned by way of illustration of organometallic compounds.

Quantities of catalyst between 0.01 and 5 parts by weight per 100 parts by weight of polyol will be employed.

The composition according to the invention may additionally contain inert fillers and various additives such as antioxidants and UV stabilizers.

According to the present invention the polyol-based plasticized composition (I) may be prepared by melting the thickening additive and then subsequently mixing it with the plasticizer, the polyol, the chain extender(s), the catalyst, and, optionally, with the fillers and the additives, in a device provided with means of stirring permitting a good homogenization of the various constituents of the composition.

The mixing is preferably performed at a temperature of between 20° C. and 100° C.

The viscosity of the composition obtained is measured with a rheometer.

According to the present invention this glycol-based plasticized composition (I) can be employed especially for obtaining a polyurethane gel. The invention also relates to these polyurethane gels.

This polyurethane gel can be obtained by bringing the plasticized composition (I) of the present invention into contact with one or more polyisocyanates. The quantities of plasticized composition (I) and of polyisocyanate may be, for example, such that the NCO/OH molar ratio is between 0.3 and 2 and, preferably, between 0.5 and 1.

In the eventuality where a chain extender is employed, the NCO/OH molar ratio will have to be calculated by taking into account the presence of the functional groups which are reactive with the isocyanate functional groups, such as the hydroxyl and/or amine functional groups, in the said chain extender.

According to the present invention the polyisocyanate employed may be an aromatic, aliphatic or cycloaliphatic polyisocyanate containing at least two isocyanate functional groups in its molecule.

By way of illustration of aromatic polyisocyanates there will be mentioned 4,4'-diphenylmethane diisocyanate (MDI), liquid modified MDIs, polymeric MDIs, 2,4- and 2,6-toluene diisocyanate (TDI) and their mixture, xylylene diisocyanate (XDI), triphenylmethane triisocyanate, tetramethylxylylene diisocyanate (TMXDI), para-phenylene diisocyanate (PPDI) and naphthalene diisocyanate (NDI).

Among the aromatic polyisocyanates, the invention is preferably concerned with 4,4'-diphenylmethane diisocyanate and, very particularly, the polymeric MDIs.

Hexamethylene diisocyanate (HMDI) and its derivatives and trimethylhexamethylene diisocyanate will be mentioned by way of illustration of aliphatic polyisocyanate.

Isophorone diisocyanate (IPDI) and its derivatives, 4,4'-dicyclohexylmethane diisocyanate and cyclohexyl diisocyanate (CHDI) will be mentioned by way of illustration of cycloaliphatic polyisocyanate.

It would not constitute a departure from the scope of the invention to employ isocyanate prepolymers obtained by reaction of an above-mentioned polyisocyanate with a polyol such as, especially, polyetherpolyol, polyesterpolyol and polydienepolyol, or with a polyamine.

The polyurethane gel according to the present invention can be obtained by adding the polyisocyanate(s) to the plasticized composition (I) with stirring and the reaction mass is then homogenized for a period which can range from 1 to 5 minutes and it is then cast and left at ambient temperature until the gel is obtained.

The physical properties of the gel thus obtained are determined next, especially its consistency, which is determined with the aid of a penetrometer.

By adjusting the proportions of thickening additive in the plasticized composition (I) the viscosity of the said composition can be easily controlled so as to obtain viscosities of at least 4 Pa•s at 20° C.

This has the advantage of having plasticized compositions with controlled viscosity which are easy to use.

The polyurethane gels obtained with the compositions of the invention can be employed in the field of the insulation of electrical or electronic components and in paramedical applications.

EXAMPLES

The examples which follow illustrate the invention.

The compositions were prepared by employing the following constituents:

POLYBD®R45 HT: hydroxylated polybutadiene of $\overline{Mn}$ equal to 2,800 (determined by steric exclusion chromatography), exhibiting a hydroxyl value $V_{OH}$, expressed in milliequivalents per gram (meq/g) of approximately 0.83, a viscosity (mPa•s at 30° C.) of 5,000 and a relative density of 0.90;

Arcol 1010: polyoxypropylene glycol of number-average molecular mass $\overline{Mn}$ of 1,000, marketed by Arco;

Baygal K55: polyethertriol marketed by Bayer A. G.;

2-ethyl-1,3-hexanediol;

Edenol W300S: diisotridecyl phthalate marketed by Henkel;

dioctyl phthalate, referred to as DOP hereinafter, marketed by Elf Atochem S. A.;

Jeffamine D2000: polyoxypropylene ending in amine functional groups, of number-average molecular mass $\overline{Mn}$ of 2,000, marketed by Huntsman;

dibutyltin dilaurate, referred to hereinafter as DBTL;

Evatane 28/150: ethylene/vinyl acetate copolymer which has a vinyl acetate weight content of approximately 28% and which has a melt index of approximately 150 g/10 min measured according to NFT standard 51-016;

Evatane 33/400: ethylene/vinyl acetate copolymer which has a vinyl acetate weight content of approximately 33% and which has a melt index of approximately 400 g/10 min, according to NFT standard 51-016;

Lotryl 35BA320: ethylene/butyl acrylate copolymer containing approximately 65% by weight of units derived from ethylene and approximately 35% by weight of units derived from butyl acrylate and exhibiting a melt index of approximately 320 g/10 min, measured according to NFT standard 51-016;

Lotader 6600 ethylene/ethyl acrylate/maleic anhydride terpolymer containing approximately 69% by weight of units derived from ethylene, approximately 28% by weight of units derived from ethyl acrylate and approximately 3% by weight of units derived from maleic anhydride and exhibiting a melt index of 40 g/10 min, measured according to NFT standard 51-016;

Orevac 9305: ethylene/vinyl acetate/maleic anhydride terpolymer which has a vinyl acetate weight content of 28% and a maleic anhydride weight content of 1%, exhibiting a melt index of 150 g/10 min, measured according to NFT standard 51-016;

Desmodur VL: polymeric MDI which has an isocyanate functional group weight content of 31% and a viscosity at 20° C. of approximately 130 mPa•s.

Preparation of the plasticized compositions (I)

The thickening additive is melted at a temperature of between 50° C. and 130° C. in a reactor fitted with a fluid-circulation jacket and a mechanical stirrer.

The various constituents are added next: the plasticizer, the polyol, the chain extenders, the catalyst, with stirring (200 rev/min) at a temperature of between 20° C. and 100° C.

The viscosity is determined on the plasticized composition (I) thus obtained, by means of a Carrimed type rheometer at 20° C. at an impulse rate of 10 rad/s.

Preparation of the polyurethane gel

The polyisocyanate(s) is (are) added with stirring to the composition obtained above, the reaction mixture is homogenized by stirring for a few minutes and the composition is then cast and left at ambient temperature until the reaction is complete.

The so-called penetration test is performed on the polyurethane gel obtained. In this test the depth of the penetration is measured in tenths of a millimeter (mm/10), at 30° C. A hollow cone with a total mass of 150 g is applied for 5 seconds to the surface of the polyurethane gel. The hollow cone initially does not touch the surface of the gel. To give an indication, the hollow cone enters the gel over approximately 60 mm/10 in the case of so-called "hard" gels and approximately 300 mm/10 in the case of so-called "soft" gels.

The so-called "pot lifetime" or "pot life" test is also performed. This test determines a so-called setting time period. This period, expressed in minutes, is counted from the instant when the plasticized composition (I) is mixed with the polyisocyanate, until 100 g of reaction mass, initially at 20° C., can no longer flow.

The results are collated in Tables 1 through 5.

In these Tables, the proportions of the various constituents of the plasticized composition (I) and of the polyisocyanates employed for obtaining the polyurethane gel are expressed in parts by weight, the viscosities measured at 20° C. at an impulse rate of 10 rad/s expressed in Pa•s, the penetration in tenths of mm (mm/10) and the pot life in minutes. Examples 1C (Table 1), 5C (Table 2), 14C and 16C (Table 4) and 18C (Table 5) are controls not in accordance with the invention but used for comparative purposes.

In Table 1 we have shown the influence of the thickening additive content on the viscosity of the plasticized composition (I).

TABLE 1

|  | Examples | | | |
| --- | --- | --- | --- | --- |
|  | 1C | 2 | 3 | 4 |
| Constituents of the plasticized composition (I) (parts by weight) | | | | |
| PolyBD ® R45 HT | 100 | 100 | 100 | 100 |
| Baygal K5 | 10 | 10 | 10 | 10 |
| Edenol W300S | 633 | 633 | 633 | 633 |
| Evatane 281150 |  | 33 | 67 | 100 |
| DBTL | 2.2 | 2.2 | 2.2 | 2.2 |

TABLE 1-continued

|  | Examples | | | |
| --- | --- | --- | --- | --- |
|  | 1C | 2 | 3 | 4 |
| Polyisocyanate (parts by weight) | | | | |
| Desmodur VL | 21.6 | 21.6 | 21.6 | 21.6 |
| NCO/OH molar ratio | 1.05 | 1.05 | 1.05 | 1.05 |
| Viscosity of the plasticized composition (I) (Pa · s) | 0.5 | 4 | 70 | 280 |
| Gel properties | | | | |
| Penetration (mm/10) | 120 | 97 | 85 | 69 |
| Pot Life (minutes) | 480 | 420 | 150 | 180 |

In Table 2 we have shown the influence of the nature of the thickening additive on the viscosity of the plasticized composition (I).

TABLE 2

|  | Examples | | | | | |
| --- | --- | --- | --- | --- | --- | --- |
|  | 5C | 6 | 7 | 8 | 9 | 10 |
| Constituents of the plasticized composition (I) (parts by weight) | | | | | | |
| PolyBD ® R45 HT | 100 | 100 | 100 | 100 | 100 | 100 |
| 2-Ethyl-1,3-hexanediol | 10 | 10 | 10 | 10 | 10 | 10 |
| DOP | 633 | 633 | 633 | 633 | 633 | 633 |
| DBTL | 4.5 | 4.9 | 4.9 | 4.9 | 4.9 | 4.9 |
| Evatane 28/150 |  | 67 |  |  |  |  |
| Evatane 33/400 |  |  | 67 |  |  |  |
| Lotryl 35BA320 |  |  |  | 67 |  |  |
| Orevac 9305 |  |  |  |  | 67 |  |
| Lotader 6600 |  |  |  |  |  | 67 |
| Polyisocyanate (parts by weight) | | | | | | |
| Desmodur VL | 26.8 | 26.8 | 26.8 | 26.8 | 26.8 | 26.8 |
| NCO/OH molar ratio | 0.90 | 0.90 | 0.90 | 0.90 | 0.90 | 0.90 |
| Viscosity of the plasticized composition (I) (Pa · s) | 0.2 | 70 | 20 | 40 | 70 | 150 |
| Gel properties | | | | | | |
| Penetration (mm/10) | 98 | 78 | 78 | 76 | 68 | 68 |
| Pot Life (minutes) | 510 | 180 | 180 | 180 | 180 | 180 |

In Table 3 we have reported 3 plasticized compositions which have a controlled viscosity resulting in polyurethane gels which have a fast setting time (low pot life), especially in the case of the composition of Example 13.

TABLE 3

|  | Examples | | |
| --- | --- | --- | --- |
|  | 11 | 12 | 13 |
| Constituents of the plasticized composition (I) (parts by weight) | | | |
| PolyBD ® R45 HT | 100 | 100 | 100 |
| 2-Ethyl-1,3-hexanediol | 10 | 10 |  |
| Jeffamine D 2000 |  |  | 30 |
| DOP | 633 | 633 | 633 |
| Evatane 33/400 | 67 | 67 |  |
| Lotader 6600 | 67 |  |  |
| DBTL | 4.9 | 9.7 | 4.9 |

TABLE 3-continued

|  | Examples | | |
| --- | --- | --- | --- |
|  | 11 | 12 | 13 |
| Polyisocyanate (parts by weight) | | | |
| Desmodur VL | 26.8 | 26.8 | 13.9 |
| NCO/OH molar ratio | 0.90 | 0.90 | 0.90 |
| Viscosity of the plasticized composition (I) (Pa · s) | 20 | 150 | 18 |
| Gel properties | | | |
| Penetration (mm/10) | 78 | 68 | 124 |
| Pot Life (minutes) | 180 | 150 | 25 |

In Table 4 the thickening aspect of an ethylene/vinyl acetate on two different compositions is demonstrated.

TABLE 4

|  | Examples | | | |
| --- | --- | --- | --- | --- |
|  | 14C | 15 | 16C | 17 |
| Constituents of the plasticized composition (I) (parts by weight) | | | | |
| PolyBD ® R45 HT | 100 | 100 | 100 | 100 |
| Baygal K55 | 10 | 10 |  |  |
| 2-Ethyl-1,3-hexanediol |  |  | 10 | 10 |
| DOP |  |  | 633 | 633 |
| Edenol W300S | 633 | 633 |  |  |
| Evatane 28/150 |  | 67 |  | 67 |
| DBTL | 2.2 | 2.2 | 4.5 | 4.9 |
| Polyisocyanate (parts by weight) | | | | |
| Desmodur VL | 21.6 | 21.6 | 26.8 | 26.8 |
| NCO/OH molar ratio | 1.05 | 1.05 | 0.90 | 0.90 |
| Viscosity of the plasticized composition (I) (Pa · s) | 0.5 | 70 | 0.2 | 70 |
| Gel properties | | | | |
| Penetration (mm/10) | 120 | 85 | 98 | 78 |
| Pot Life (minutes) | 480 | 150 | 510 | 180 |

In Table 5 the thickening aspect of two vinyl acetate copolymers on a composition based on polyoxypropylene glycol (Arcol 1010) is demonstrated.

TABLE 5

|  | Examples | | | |
| --- | --- | --- | --- | --- |
|  | 18C | 19 | 20 | 21 |
| Constituents of the plasticized composition (I) (parts by weight) | | | | |
| Arcol 1010 | 100 | 100 | 100 | 100 |
| DOP | 300 | 300 | 300 | 300 |
| Evatane 28/150 |  |  |  | 33 |
| Evatane 33/400 |  | 33 | 67 |  |
| DBTL | 1.5 | 1.5 | 1.5 | 1.5 |
| Polyisocyanate (parts by weight) | | | | |
| Desmodur VL | 28.5 | 28.5 | 28.5 | 28.5 |
| NCO/OH molar ratio | 1.05 | 1.05 | 1.05 | 1.05 |
| Viscosity of the plasticized composition (I) (Pa · s) | 0.14 | 11.5 | 252 | 12.6 |
| Gel properties | | | | |
| Penetration (mm/10) | 97 | 72 | 85 | 65 |
| Pot Life (minutes) | >480 | >480 | 420 | >480 |

What is claimed is:

1. A polyurethane gel resulting from the reaction of at least one polyisocyanate (1) and a plasticized composition (2) comprising
   (a) at least one polyol,
   (b) at least one plasticizer,
   (c) a polymeric thickening additive sufficient to obtain a viscosity at 20° C. of at least 4 Pa•s measured at an impulse rate of 10 rad/s, characterized in that the thickening additive is chosen from the group consisting of:
   (a) copolymers of ethylene and of at least one α-olefin containing from 3 to 8 carbon atoms wherein the copolymers have a relative density ranging approximately from 0.89 to 0.95;
   (b) copolymers of ethylene and of at least one vinyl ester of a saturated carboxylic acid containing 2 to 6 carbon atoms;
   (c) ethylene/unsaturated acid ester copolymers;
   (d) terpolymers which, in addition to the units derived from ethylene and the units derived from a vinyl ester of a saturated carboxylic acid, or in addition to the units derived from ethylene and the units derived from an unsaturated acid ester, include units derived from an unsaturated acid anhydride;
   (e) terpolymers which, in addition to the units derived from ethylene and the units derived from an unsaturated acid ester, include units derived from an unsaturated glycidyl monomer; and
   (f) graft polymers resulting from the grafting of at least one monomer chosen from the group consisting of carboxylic acids containing ethylenic unsaturation, the corresponding anhydrides, the derivatives of the acids and the derivatives of the acid anhydrides, onto the copolymers (a), (b), and (c) and onto the terpolymers (d).

2. The polyurethane gel according to claim 1, characterized in that a sufficient quantity of the thickening additive in the plasticized composition (2) is employed to obtain a viscosity at 20° C. of between 5 Pa•s and 300 Pa•s.

3. The polyurethane gel according to claim 1, characterized in that it includes at least 5 parts by weight of the thickening additive per 100 parts by weight of polyol.

4. The polyurethane gel according to claim 3, characterized in that it includes 30 to 110 parts by weight of the thickening additive per 100 parts by weight of polyol.

5. The polyurethane gel according to claim 1, characterized in that the polyol is chosen from the group consisting of polyesterpolyols, polyetherpolyols, polythioetherpolyols, polyacetalpolyols, polycarbonatepolyols, polyesteramidepolyols, polyamidepolyols, polydienepolyols, and mixtures thereof.

6. The polyurethane gel according to claim 1, characterized in that it includes at least 10 parts by weight of the plasticizer per 100 parts by weight of polyol.

7. The polyurethane gel according to claim 6, characterized in that it includes 50 to 1000 parts by weight of the plasticizer per 100 parts by weight of polyol.

8. The polyurethane gel according to claim 1, characterized in that the polyisocyanate is a 4,4'-diphenylmethane diisocyanate (MDI) or a polymeric MDI.

9. The polyurethane gel according to claim 1, characterized in that the molar ratio of isocyanate functional groups to hydroxyl functional groups of the plasticized composition is between 0.3 and 2.

10. The polyurethane gel according to claim 9, characterized in that the molar ratio of isocyanate functional groups to hydroxyl functional groups of the plasticized composition is between 0.5 and 1.

11. The polyurethane gel according to claim 8, characterized in that the molar ratio of a isocyanate functional groups to hydroxyl functional groups of the plasticized composition is between 0.3 and 2.

12. The polyurethane gel according to claim 11, characterized in that the molar ratio of isocyanate functional groups to hydroxyl functional groups of the plasticized composition is between 0.5 and 1.

13. The polyurethane gel according to claim 1, wherein the plasticized composition further comprises a catalyst.

14. The polyurethane gel according to claim 13, wherein the catalyst is selected from the group consisting of tertiary amines, imidazoles and organometallic compounds.

15. The polyurethane gel according to claim 1, wherein the plasticized composition further comprises one or more chain extenders.

16. The polyurethane gel according to claim 15, wherein the chain extender is selected from the group consisting of polyols of molecular mass of between 62 and 500 and polyamines of molecular mass of between 62 and 500.

* * * * *